United States Patent [19]

Yazaki et al.

[11] 4,057,385
[45] Nov. 8, 1977

[54] DECKLE COOLING MEANS TO PREVENT LEAKAGE

[75] Inventors: Takao Yazaki; Kazuhide Hattori, both of Yokkaichi, Japan

[73] Assignee: Mitsubishi Petrochemical Co., Ltd., Tokyo, Japan

[21] Appl. No.: 716,040

[22] Filed: Aug. 20, 1976

Related U.S. Application Data

[62] Division of Ser. No. 591,722, June 30, 1975, abandoned.

[30] Foreign Application Priority Data

June 29, 1974 Japan ................................. 49-73807

[51] Int. Cl.$^2$ ............................................. B29F 3/04
[52] U.S. Cl. ...................................... 425/466; 425/327
[58] Field of Search ............ 425/466, 325, 327, 378 R

[56] References Cited

U.S. PATENT DOCUMENTS

| | | | |
|---|---|---|---|
| 3,840,318 | 10/1974 | Solop | 425/466 X |
| 3,870,454 | 3/1975 | Penrod | 425/466 |

*Primary Examiner*—Robert L. Spicer, Jr.
*Attorney, Agent, or Firm*—Sughrue, Rothwell, Mion, Zinn and Macpeak

[57] ABSTRACT

In a process for melting, extruding, and forming a thermoplastic synthetic resin, wherein a deckle mounted on a die device of an extruder is moved lengthwise of a slit in the die to thereby vary the length of the slit and to adjust the width of a flat film being extruded, the improvement comprising stopping the leaking of the molten resin around the deckle portion by forcibly cooling the deckle with a cooling medium, such as air, water or the like, so as to increase the viscosity of the molten resin around the deckle, whereby a decreased fluidity of the molten resin occurs.

2 Claims, 5 Drawing Figures

DECKLE COOLING MEANS TO PREVENT LEAKAGE

RELATED U.S. APPLICATION

This application is a division of Ser. No. 591,722, filed June 30, 1975, now abandoned.

BACKGROUND OF THE INVENTION

1. Field of the Invention

This invention relates to a method for stopping the leaking of a resin around the deckle portion of an extruder in which the deckle mounted on a die device of the extruder is moved lengthwise of a slit to thereby vary the length of the slit and to adjust the width of a flat film, and which is used in melting, extruding, and forming a thermoplastic synthetic resin.

2. Description of the Prior Art

A flat die device used for, extruding, and forming a thermoplastic synthetic resin must be provided with a means for adjusting the length of a slit in order to easily vary the width of the extruded products such as films or sheets.

Heretofore, two means, an inner deckle and an outer deckle, have been used as the means for varying this length of the slit. One means, that is, the inner deckle is designed so that a deckle, such as a piano wire is inserted into a gap formed in a portion of the lands of the die, and by means of the resin pressure, the deckle is pressed against, and placed in intimate contact with the lands to interrupt the flow passage of molten resin, thus adjusting the width of the film. The other means, that is, the outer deckle, is designed so that a jig is pressed against and mounted with a clamping metal piece on the outer surface of the die slit, and a sealed portion within the jig interrupts the flow of resin, thus adjusting the width of the film.

However, these conventional means have various difficulties and are not sufficient to prevent a flow of resin. Namely, the inner deckle has the disadvantages that it tends not only to produce a resin leak which is heavier than that of the outer deckle due to an incomplete seal caused by a slight bend of the inner deckle which occurs during operation or the like but also the inner deckle itself is worn to a great extent, and that the operability in moving the deckle is not good due to the bend of the deckle. On the other hand, the outer deckle has the disadvantage that since it is mounted on the outlet of the slit, an air gap extending from the die slit to a cooling roll for cooling and solidifying the molten film unavoidably becomes longer. As a result of this, neck-in which is the difference between the slit length and the film width becomes greater to render the thickness between the opposite edges of the film thicker. Thus, films of a uniform thickness can not be obtained efficiently. In addition, using the two means as described above, it is necessary to periodically remove a resin which has leaked around the die slit because of an unavoidable occurrence of the resin leakage, and moreover, a jig or the like to receive the resin which has leaked must be provided because of an incomplete seal, and as the case may be, a winding of the resin which has leaked around the cooling roll or the like tends to give rise to difficulties such as a stoppage in the production of films.

SUMMARY OF THE INVENTION

As is evident from the foregoing, the prior art devices merely depend upon means for mechanically placing a deckle in intimate contact and interrupting the flow passage of resin with the deckle to vary the length of the slit and to adjust the width of a flat film, and for this reason, the disadvantages noted above of the inability to stop the resin from leaking will result. In view of the fact as described above, this invention has been developed on the basis that effective utilization of a basic characteristic of the thermoplastic resin, that is, the property in which the flow characteristics vary greatly with temperature, in addition to the above-described means, can stop the resin from leaking around the deckle portion as desired.

More specifically, the present invention provides a process for melting, extruding, and forming a thermoplastic synthetic resin, wherein a deckle mounted on a die device of an extruder is moved lengthwise of a slit of the die to thereby vary the length of the slit and to adjust the width of a flat film, the improvement comprising stopping a leaking of the molten resin around the deckle portion, by forcibly cooling the deckle with a cooling medium, such as air, water or the like, so as to increase the viscosity of the molten resin around the deckle, resulting in a decrease in the fluidity of the molten resin.

DETAILED DESCRIPTION OF THE INVENTION

The thermoplastic resin which can be employed in this invention is not particularly limited and any thermoplastic synthetic resin of polyolefin resins having a Vicat softening point (determined by ASTM D-1525) of about 72° to 160° C, olefin copolymer resins (Vicat softening point; about 75° to 150° C), polyvinyl chloride resins (Vicat softening point; about 64° to 90° C), polyamide resins (Vicat softening point; about 65° to 180° C), polystyrene resins (Vicat softening point; about 78° to 107° C), etc. can be employed. In particular, crystalline polyolefin resins and olefin copolymer resins such as polyethylene having a Vicat softening point of about 75° to 130° C, polypropylene (Vicat softening point; about 72° to 160° C), ethylene-vinyl acetate copolymers (Vicat softening point; 72° to 90° C), ethylene-propylene copolymers (Vicat softening point; about 72° to 160° C), etc. are desirable.

Embodiments of the present invention will be explained in detail with reference to the accompanying drawings.

Figure 1:
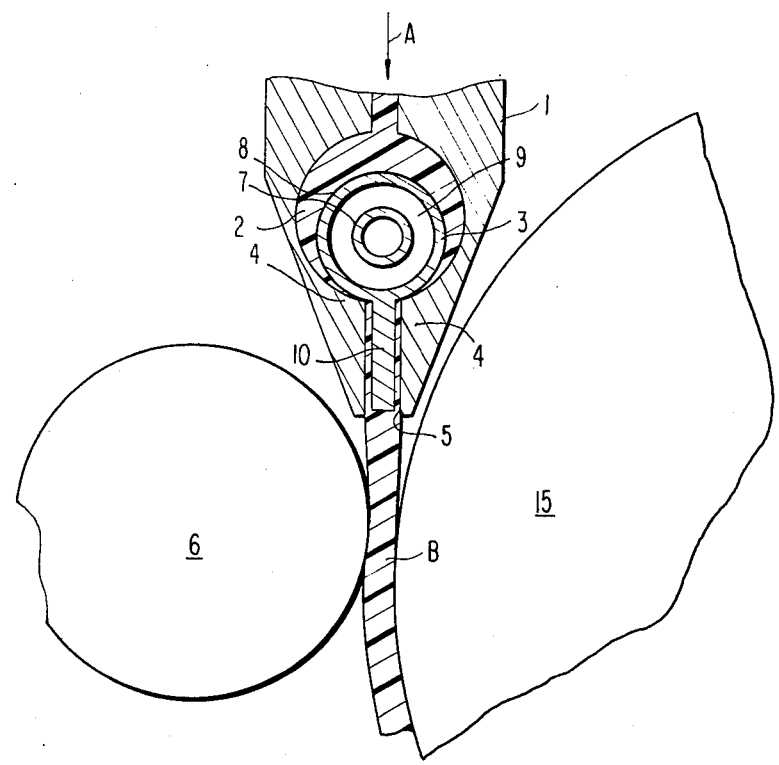
FIG. 1 is a sectional view, as viewed from the side, of a die device on which a deckle of the present invention is mounted.
Figure 2:
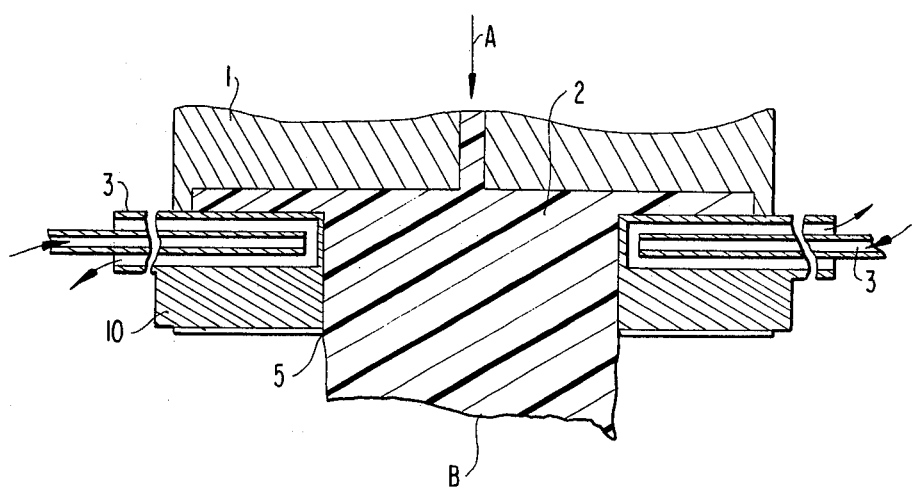
FIG. 2 is a sectional view showing the interior of the die of FIG. 1 as viewed from the front.

Referring now to FIGS. 1 and 2, a molten resin A is flowed into a manifold 2 within a flat die 1 and spread within the manifold 2.

The width of the molten resin A is controlled by an inner deckle 3, described in detail hereinafter, and the thickness of the resin is further controlled by lands 4, and the molten resin is extruded as a film B though a slit 5, which serves as an outlet to the outside. The extruded film B is cooled and solidified by a metal cooling roll 15. A rubber roll 6 functions to press the film B against the cooling roll 15. The inner deckle 3 used in the invention must be forcibly cooled, preferably until the resin temperature in the periphery of a portion wherein the deckle comes into contact with the die reaches temperatures lower than the Vicat softening point of the resin. The deckle can be cooled using water, air, steam, or refrigeration.

Figure 3:
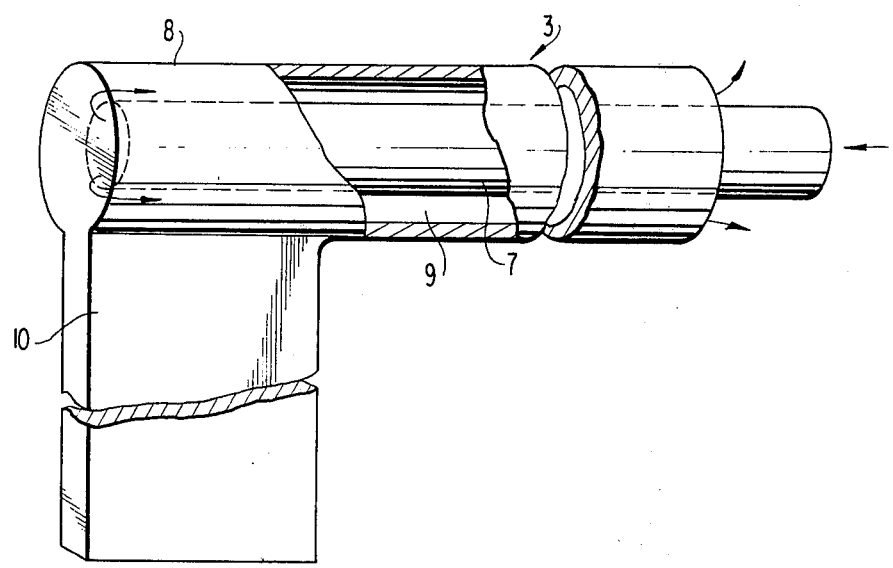
FIG. 3 is a perspective view of a dual tube type deckle according to the present invention.

As shown in FIG. 3, the inner deckle 3 has a dual tube construction comprising a combination of an inner tube 7 and an outer tube 8, and a passage 9, between the inner tube 7 and the outer tube 8 into which a cooling medium such as water, air, steam or the like is passed in the direction as indicated by the arrow. A fin 10 is provided to prevent entry of the resin into the space formed in the lands 4. When the cooling medium is passed into the inner deckle 3 inserted and disposed in the manifold 2, the molten resin A around the inner deckle 3 is cooled and the viscosity increases. Even if a small gap should be formed between the outer tube 8 and a wall of the manifold portion 2 in contact with the outer tube 8, the fluidity of the resin within the gap is extremely poor so that no significant flow is observed. Therefore, substantially no leaking of the resin therethrough occurs. Likewise, substantially no leaking of the resin between the land plate 10 and the lands 4 occurs.

Where the extruding pressure of the resin is low or where the length of lands 4 is short, the land plate 10 can be omitted. Additionally, the land plate 10 can be separated from the deckle body and used without cooling. The shape of the deckle is not limited to a cylindrical shape and the method for introducing the cooling medium, and the cooling means itself can be modified in various ways. While the deckle can be inserted into the above-described manifold, or the land portion, the slit portion, etc., it will be appreciated that the arrangement of the deckle can be varied from thus described arrangement without departing from the spirit of the present invention.

It will be noted that at the time of adjusting the length of the die slit, forced cooling of the deckle can be stopped to thereby facilitate the flow of the molten resin and the resin which flows with difficulty around the deckle with the aid of heat from the die heater, resulting in a movement of the deckle.

As described above, since, in the method for stopping the leaking of the resin around the deckle portion according to the present invention a deckle is cooled directly or indirectly, the thermoplastic resin present in a gap within the die accommodating the deckle therein is cooled. As a result, the molten resin whose viscosity has been increased forms a film which flows with difficulty in the vicinity of the deckle and the resin itself loaded in that area. From this, the method of the invention gives rise to excellent effects such that the resin leaking can be completely stopped and the width of the film can be accurately and easily adjusted depending upon the positioning of the cooling means.

The following example is given to illustrate the invention in greater detail.

EXAMPLE

Figure 4:
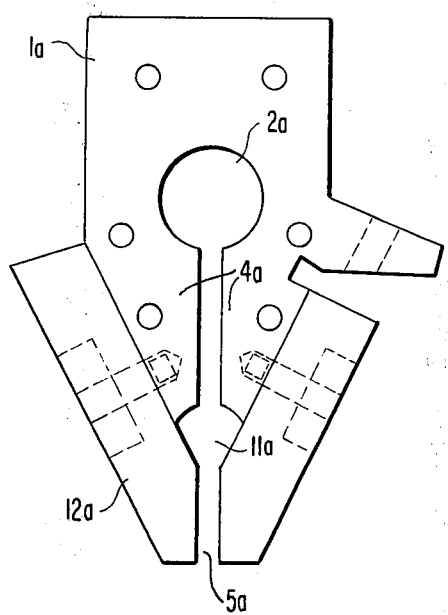
FIG. 4 is a sectional view, as viewed from the side of a die having a land portion on which a deckle can be mounted.
Figure 5:
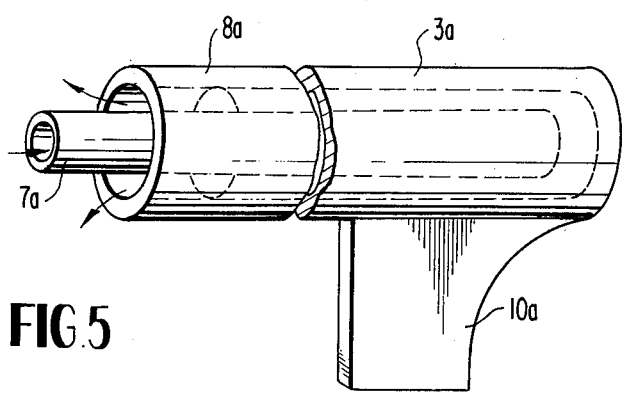
FIG. 5 is a perspective view of a dual tube type deckle according to the present invention having a land plate formed with a one-fourth circular cut.

A dual tube type inner deckle 3a as shown in FIG. 5 was mounted on a die 1a as shown in FIG. 4. The reference numeral 2a designates a manifold, and a clearance 11a was formed between the land 4a. This clearance 11a was formed by cutting and polishing the nose of the die 1a and applying a hard chrome plating thereto and has a gap sufficiently large to receive therein a round bar of about 11 $\phi$mm. A pair of steel plates 12a were secured to the lands 4a to form the slit 5a under the clearance 11a. The inner deckle 3a comprised an SUS pipe, one end of which was closed, in the form of an outer tube 8a, 10.5 $\phi$mm outside diameter and 8.0 $\phi$mm inside diameter, with a length of the 330mm, the land plate 10a being mounted integrally therewith. This land plate 10a was made of a copper plate of a thickness of 0.7 mm and a height of 20 mm. A one-fourth circular cut of a radius of 20 mm was formed at the lower end of the land plate 10a on the closed side of the outer tube 8a.

The inner tube 7a comprised a copper tube, 5 $\phi$mm outside diameter × 3 $\phi$mm inside diameter × 400 mm length. It was so designed that the outer tube 8a was disposed within the die 1a in such a manner that the inner tube 7a assumed a position in the center of the outer tube 8a, and water for cooling was passed through the passage 9 between the inner tube 7a and the outer tube 8a so that the inner deckle 3a could be cooled principally by the heat of vaporization the water. Then, with the quantity of water passing to the inner deckle 3a set to 100 ml/min., low density polyethylene (melting point: 113° C; Vicat softening point: 81° C (ASTM D-1525) melt index: 8; density: 0.918 g/cm$^3$) at a resin temperature of 300° C was extruded in the form of a film at a resin pressure of 100 kg/cm$^2$ through a slit of a width of 360 mm and a gap of 0.8 mm, and as a result, no resin leaking occurred. The resin temperature around the portion wherein the outer tube portion 8a of the inner deckle 3a came into contact with the walls of the lands 4a in the clearance 11a was 80° C.

In about 30 seconds after stopping the passing of the water, movement of the deckle was possible and the width of the die slit could be adjusted.

COMPARISON EXAMPLE

As a result of a test carried out under entirely the same conditions as that of the embodiment as previously described except that the deckle was not cooled, the resin leakage was observed between the land plate and the lands. The quantity of resin leakage measured was 0.145 kg/hr.

While the invention has been described in detail and with reference to specific embodiments thereof, it will be apparent to one skilled in the art that various changes and modifications can be made therein without departing from the spirit and scope thereof.

We claim:

1. In a die structure having manifold means within the die structure for receiving molten resin, an outlet slit through which a thin film of molten resin may be extruded and deckle means for controlling the width of the resin film being extruded from said slit the improvement comprising said deckle means being comprised of a cylindrical portion having cooling passages therein disposed in said manifold means in contact with the portions of said die structure defining the entrance to said slit from said manifold and fin means integrally connected to said cylindrical portion and extending into said slit.

2. In a die as set forth in claim 1 wherein said cylindrical portion is comprised of a first hollow tubular member closed at one end and a second concentric tubular member disposed within and spaced from said first tubular member to define the passages for the flow of a coolant.

* * * * *